(No Model.)
E. A. BURDICK.
Apparatus for Curing Tobacco.
No. 239,440. Patented March 29, 1881.
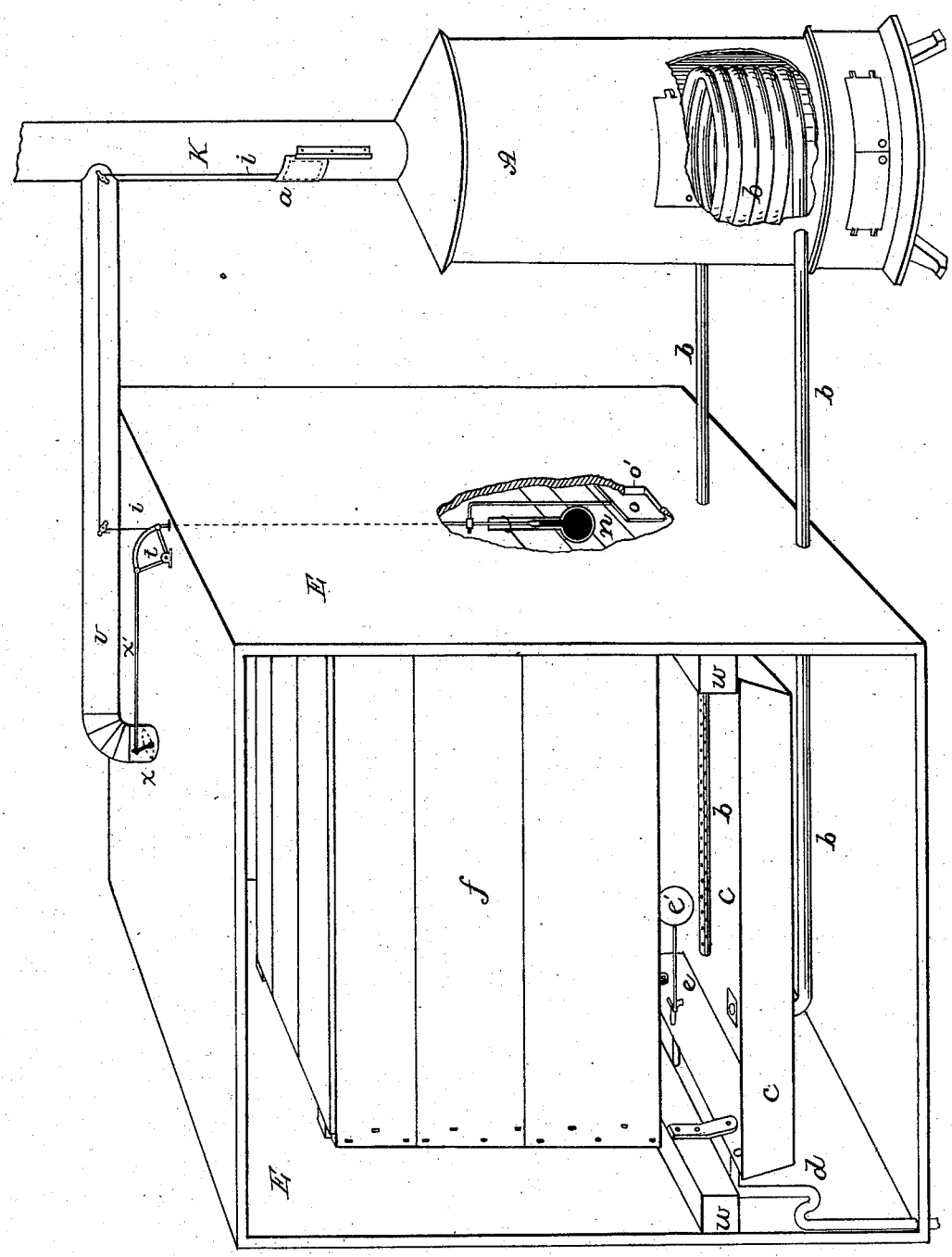
WITNESSES
Wm H Chapin
J D Garfield
INVENTOR
Edwin A Burdick,
By Henry A Chapin
ATTORNEY

UNITED STATES PATENT OFFICE.

EDWIN A. BURDICK, OF SPRINGFIELD, MASSACHUSETTS, ASSIGNOR OF ONE-HALF TO WILLIAM SIMPSON, OF SAME PLACE.

APPARATUS FOR CURING TOBACCO.

SPECIFICATION forming part of Letters Patent No. 239,440, dated March 29, 1881.

Application filed December 16, 1880. (No model.)

*To all whom it may concern:*

Be it known that I, EDWIN A. BURDICK, a citizen of the United States, residing at Springfield, county of Hampden, and State of Massachusetts, have invented new and useful Improvements in Apparatus for Curing Tobacco, of which the following is a specification.

My invention relates to the details of the construction of the steam-generating and heat-regulating devices for producing and governing the degree of heat in a tobacco curing and sweating chamber, the object being to produce rapidly and economically an ample supply of steam for heating the said chamber, to provide for automatically governing the water-supply to the evaporating-pan, and for regulating the degree of heat in said chamber and in the heating device.

The drawing forming part of this specification shows a tobacco curing and sweating chamber having its front wall removed, the heating-furnace therefor, and connecting-pipes and devices for automatically operating to govern the supply of water and heat therefor.

In the drawing, A is a furnace. $b$ is a water heating and circulating pipe. $c$ is an evaporating-pan. $d$ is a trapped overflow-pipe. $e$ is a water-supply cock and ball-float. E is the sweating and curing chamber. $f$ represents a case of tobacco or box for holding it. $n$ is a mercurial governor. $o$ is an air-gate, operating to open an air-passage through the side of chamber E. $s$ is a vertical piston-rod, one end of which is inserted in the tube of the governor $n$. $t$ is a bell-crank, pivoted on chamber E. $v$ is a ventilating-pipe, leading from the interior of chamber E to the smoke-pipe of furnace A. $x$ is a valve in pipe $v$. $x'$ is a connecting-rod between bell-crank $t$ and valve $x$. $a$ is a gate, adapted to close and open an air-passage in the smoke-pipe K of the furnace A. $i$ is a cord, attached to gate $a$ and to one arm of the bell-crank. $w\ w$ are supports on the inner sides of chamber E, upon which case $f$ is placed.

I construct the curing and sweating chamber of any suitable materials, providing it with a door, which may be opened for placing the case $f$ inside of the chamber, causing it to rest upon the supports $w$ or other suitable device, so that it may conveniently be sustained over the evaporating-pan $c$ therein. The said pan $c$, I make preferably of metal, and suspend or otherwise properly support it within chamber E, somewhat above its bottom, as shown. From near the top edge of said pan is led an overflow-pipe, $d$, having a trap therein, as shown, and adapted to discharge any surplus of water from pan $c$ down beneath the bottom of chamber E. Water is conveyed to the pan $c$ by a proper pipe leading through one of the walls of chamber E, and, terminating within said pan, has a cock and ball, $e$, attached thereto, as shown.

A furnace, A, is constructed with a coil of water-circulating pipe, $b$, within it, around the inner wall of its fire-box. One end of said pipe $b$ extends through the side of chamber E, and horizontally over and near to the bottom of pan $c$, and that part thereof within the pan is perforated, as shown, its end being closed. The other end of pipe $b$ is attached to the bottom of pan $c$, upon the under side thereof, and is adapted to receive water flowing from said pan through an opening in its bottom, as shown.

Through the broken-away portion of one wall of chamber E is shown a mercurial governor, $n$, consisting of a suitable bulb and vertical tube, as shown, partly filled with mercury. Said governor is suitably supported within chamber E, near to one side. A piston-rod, $s$, having its lower end properly fitted to the tubular portion of said governor, extends therefrom up through the top of chamber E, and there is connected to one arm of a bell-crank, $t$, which is pivoted on said chamber, as shown, and the other arm of said bell-crank is connected to a valve, $x$, by a rod, $x'$.

Through the side of chamber E is formed an air-passage, $o'$, which is opened and closed by a vertically-operating gate, $o$, said gate being suspended from rod $s$, as shown.

The smoke-pipe K of furnace A has an air-hole cut in its side, as shown by dotted lines, and a gate, $a$, suspended by a cord, $i$, one end of which is attached to one arm of bell-crank $t$, is arranged to open and close said air-hole in pipe K.

A ventilating-pipe, $v$, attached to an opening in the top of chamber E, leads from thence to and into the smoke-pipe K of furnace A, and a stop-valve, $x$, is pivoted in said pipe, at or near its junction with said chamber.

The case $f$, placed in chamber E, may be the ordinary packing-case used for leaf-tobacco, or it may be one which is specially used with chamber E, within which to place tobacco for curing. Said case is provided with an ordinary cover adapted to properly cover the contents of said case during treatment.

It is obvious that instead of using the bulb and tube $n$ for holding mercury, other devices may be employed, such as any suitable vessel provided with a flexible diaphragm upon which the expansive effects of the mercury under the influence of heat may be exerted; but the device shown is preferable.

The operation of my improved tobacco-curing apparatus is as follows, viz: The case $f$, having been filled with leaf-tobacco in a moist condition, is placed in chamber E. The latter is closed, and water is supplied to the evaporating-pan $c$, which is filled nearly full, covering the pipe $b$, and when so filled the ball $e'$ rises to such a height as to gradually close the water-cock in the usual way, and prevent any further supply until the water in pan $c$ becomes, by evaporation, reduced below the proper level. When pan $c$ is thus filled with water the circulating-pipe $b$ is likewise filled, and a fire may now be started in furnace A. The positions of gate $o$, valve $x$, and gate $a$, as shown in the drawing, are those in which they are found before the chamber E is heated. As soon as the heat from furnace A takes effect upon the water within the coiled pipe $b$, said water, or the steam generated therein, begins to circulate from said coil into the water in the pan $c$ through the perforated portion of said pipe within the pan, and the water passes through the bottom of the latter, and the pipe thereunder, back to said coil, and soon a rapid circulation is established, resulting in bringing the water in pan $c$ quickly to a boiling-point, thus causing steam to be rapidly generated, and to fill chamber E. Once that the water in pan $c$ is made to boil, a very moderate fire in furnace A will keep it to the evaporating-point, either at 212° or under, according to the condition of the fire.

As it is more or less difficult to govern with any great accuracy the degree of heat required within chamber E for treating different qualities of tobacco, by simply increasing or decreasing the fire by which steam is generated, I have, in the application of the mercurial governor $n$, and its connections with gates $o$ and $a$ and valve $x$, provided means whereby, when an excessive degree of heat is produced in chamber E, cold air may enter said chamber by the opening $o'$ through its side, and some portion of the steam within it may escape through pipe $v$ into the smoke-pipe K, and simultaneously with the above action of gate $o$ and valve $x$ gate $a$ on pipe K drops down, opening a cold-air passage into said pipe, and so causing the draft upon furnace A to be reduced as to lessen the strength of the heat upon the coiled pipe $b$, and to reduce the evaporation in pan $c$. When the mercury in the governor $n$ again drops, caused by a reduction of the heat in chamber E, the heat again rises therein to such a point as the apparatus may have been adjusted to work under. The action of the said devices for controlling the heat in said chamber originates in the governor $n$. It will be seen that when the heat drives the mercury up in the tube rod $s$ is thereby lifted, carrying with it gate $o$, and through bell-crank $t$ opening valve $x$ in the ventilator-pipe $v$, and the same movement of the bell-crank causes gate $a$ to drop, opening the air-passage in pipe K, with the result above described, and the opening and closing movements of said gates and valve are proportionate to the variations either way of the mercury-column from its adjusted working-point.

By supplying pan $c$ automatically with water by means of the cock and ball $e$, operating in the usual manner, to make up for the loss thereof by evaporation, and by providing an overflow-pipe for carrying away from said pan any surplus of water, trapped so that no steam from chamber E can escape through it, great regularity of evaporation and consequent heating effects is obtained.

I do not here claim the combination, with a tobacco-curing chamber, of a pan, devices for heating the water, and for supplying and discharging water, as this will constitute the subject of another application for Letters Patent; nor do I claim self-operating appliances for admitting water to supply loss by evaporation, nor devices to admit air when the temperature is raised; but

I claim—

1. The combination, in a tobacco-curing apparatus, of a curing-chamber provided with an evaporating-pan, a heater constructed to receive water flowing to and from said pan, and appliances whereby cold water is admitted automatically to the pan to supply that lost or evaporated, substantially as set forth.

2. In combination with the curing and sweating chamber E, furnace A, the open pipe $b$ and pan $c$, and appliances, substantially as described, whereby the pan $c$ is caused to be supplied automatically with a uniform quantity of water, substantially as set forth.

3. A tobacco-curing chamber provided with air inlet and outlet openings, in combination with a heater having a smoke pipe or flue, K, provided with an opening, and a governor connected to the valves or gates of all said openings to operate the same, substantially as set forth.

EDWIN A. BURDICK.

Witnesses:
H. A. CHAPIN,
J. D. GARFIELD.